United States Patent Office 3,642,661
Patented Feb. 15, 1972

3,642,661
SiO₂-Al₂O₃-NiO CATALYST AND ITS
PREPARATION
Gordon B. Jolley and Durward T. Roberts, Jr., Baton Rouge, La., assignors to Esso Research and Engineering Company
No Drawing. Filed Oct. 21, 1969, Ser. No. 868,210
Int. Cl. B01j 11/40
U.S. Cl. 252—453                                6 Claims

ABSTRACT OF THE DISCLOSURE

This invention relates to a method for preparing a catalyst complex especially useful in the selective codimerization of n-butenes with propylene to form lightly branched $C_7$ heptenes, said preparation comprising the step of forming a dispersion of colloidal alumina in an aqueous solution containing nickel salt and a hydrous silica sol, coprecipitating said nickel salt and said hydrous silica sol with a suitable anion such as carbonate whereby a slurry of precipitated nickel salt and alumina silica gel is formed; decomposing the precipitated nickel salt under conditions such that substantially all combined carbon oxides are removed and activating the resulting nickel oxide by heating in an oxygen-containing atmosphere at a temperature ranging from between 800° F. and 1400° F. for a period of time ranging from 0.1 to 50 hours to form said catalyst complex.

This invention relates to the codimerization of n-butenes with propylene. In one aspect, this invention relates to an improved catalyst particularly adapted for use in such codimerization. In another aspect, this invention relates to a method for making such a catalyst.

The polymerization of monoolefins, particularly mono-1-olefins with nickel oxide supported on a support such as silica-alumina, alumina, silica, kieselguhr, activated clay, charcoal, and the like, as been disclosed for example, in patents to G. C. Bailey and J. A. Read U.S. 2,381,198 and 2,581,228. In general, the supported nickel oxide catalysts are useful for polymerization of $C_2$ to $C_5$ mono-olefin, such as ethylene, propylene, 1-butene, 2-butene, isobutylene, 1-pentene, and the like, and combinations thereof. The mono-1-olefins are preferred. In general the products of this catalyzed polymerization are dimers, trimers, tetramers, or the like, of the starting olefin.

In a copending application bearing Serial No. 661,225 filed August 17, 1967 (now abandoned), Lloyd A. Pine and Joseph K. Mertzweiller disclose a process for codimerizing propylenes and n-butenes in liquid phase in the presence of a supported nickel oxide catalyst at conditions suitable to selectively form heptene-rich reaction product mixtures which are predominantly lightly branched. The reaction is conducted at superatmospheric pressures and at temperatures ranging from 140° F. to 300° F. and under a pressure ranging from 150 to 1000 p.s.i.a. The molar ratio of $C_4$ to $C_3$ olefins is maintained at from 1:1 to 5:1 and under these conditions the process is highly selective for the formation of heptenes yielding 34 to 45% linear and singular branched heptenes.

In this copending application and the patents identified hereinabove, the nickel oxide is impregnated upon the silica-alumina support and with particular reference to the codimerization of normal butene and propylene, it has been discovered that such a nickel oxide catalyst loses its selectivity to the heptene dimer over prolonged aging. The impregnated catalyst is made by precipitating nickel carbonate onto a 25% alumina, 75% silica base, after which it is calcined at 1100° F. The nickel oxide is spread over the surface of the base.

Therefore, an object of this invention is to provide a catalyst useful in a codimerization system for the conversion of a mixture containing n-butenes and n-propylene to one containing lightly branched heptene. Another object of this ivention is to provide a method for preparing a nickel oxide supported on a silica-alumina base catalyst that possesses increased activity and selectivity in the codimerization of n-butene and propylene to slightly branched heptenes over a prolonged period of time.

Other objects and many of the attendant advantages of this invention will be readily appreciated as the same becomes better understood by reference to the following detailed description.

Briefly, this invention relates to a method for preparing a catalyst for use in the codimerization of propylene with n-butenes, said method comprising the steps of forming a dispersion of colloidal alumina in an aqueous solution containing a nickel salt and a hydrous silica sol; coprecipitating said nickel salt and said hydrous silica sol with suitable anion whereby a slurry of precipitated nickel salt and alumina-silica gel is formed; decomposing the nickel salt to nickel oxide under conditions such that substantially all combined carbon oxides, are removed and activating the resulting nickel oxide by heating in an oxygen-containing atmosphere at a temperature ranging from between 800° F. and 1400° F. for a period of time ranging from 0.1 to 50 hours, to form said catalyst in which the amount of nickel (Ni) ranges from 1 to 35 wt. percent based on the total weight of the catalyst, the amount of alumina ($Al_2O_3$) ranges from 1 to 45 wt. percent based on the weight of the alumina-silica gel and the weight of silica ($SiO_2$) ranges from 99 to 55 wt. percent based on the weight of the alumina-silica gel.

We have now found that normal butylene and propylene can be codimerized under specific reaction conditions to provide a significant amount of lightly branched heptene in the reaction mixture. The normal heptene is the valuable product of the reaction mixture and the $C_9+$ olefins contained therein are the low value products, therefore maximizing the amount of heptene produced is very important for commercial purposes.

We have found that the life and selectivity of the nickel oxide catalyst disclosed in the above-identified copending application can be improved by its method of preparation. The catalyst in the aforesaid copending application is made by an impregnation technique well known in the prior art. We have discovered that if the catalyst is made by the specific coprecipitation method, its selectivity, activity, and amount of lightly branched heptenes are greatly enhanced.

As used herein the term "nickel oxide" denotes any oxides of nickel, or mixture of oxides of nickel that has particular reference to the form of oxide of nickel which results from activation by heating in an oxygen-containing atmosphere, such as air, in the maner more fully described below. The chemistry of the oxides of nickel appears to be not fully understood. The existence of nickelous oxide (NiO) and nickel dioxide ($NiO_2$) appears to be established beyond doubt. In addition to these oxides, nickel sesquioxide ($Ni_2O_3$), nickelocic oxide ($Ni_3O_4$) and nickel peroxide ($NiO_4$) have been reported. Suffice to say, that our term nickel oxide, includes all these forms of nickel.

In our preparation, the nickel compound employed as a source of nickel oxide may be nickel nitrate, nickel sulfate, nickel acetate, or any other nickel salt which is soluble in water. Any nickel compound in which the anion is not decomposed by heating, such as sulfate, is washed off the catalyst so that no more than 0.5% by weight remains thereon.

The source of silica sol is prepared by mixing a water-soluble silicate, usually sodium or potassium silicate with water. To the resulting sol is added the nickel compound in water. The silica sol can be prepared by well-known ion exchange techniques as described in Dowex Ion Exchange, published in 1958 by the Dow Chemical Company of Midland, Mich.

In such an exchange technique, a suitable resin is tested with a silicate liquid in which there is a reversible exchange of the ions between the solid and the liquid in which there is no substantial change in the structure of the solid. In this definition, the solid is the ion-exchange material of the resin particle.

Examples of suitable resins are: Amberlite IR–120 resin which is a highly acidic cation exchange resin made by polymerizing styrene and divinyl benzene. The divinyl benzene is used to crosslink. It is sulfonated to give sulfuric acid ($SO_3H$) sites with an exchange capacity of 1.9 mmg./ml. of wet resin. N brand $NaSiO_3$ which is a fused glass soluble in water and is sold as 8.9 wt. percent $Na_2O$ and 27.6 wt. percent $SiO_2$. Its weight is 11.6 lb./gal. and has a viscosity of 180 centipoises. The specific gravity is 1.41.

The alumina must be in the form of a partially polymerized alumina which resembles fibrous crystals being about from 5 to 10 millimicrons in diameter and 50 to 200 millimicrons in length and having a surface area of 200 to 400 m.$^2$ per gram. Such particles are dispersible but insoluble in water and when dispersed so as to provide a 4% solution of them on a weight basis, provide a solution having a pH of from 4 to 4.5.

The Du Pont Chemical Company provides a colloidal alumina which is a white powder dispersible in water to form stable positively charged colloidal fibrillated crystals measuring 100 millimicrons by 5 millimicrons. Chemical structure is boehmite-AlOOH, surface area is 275 sq. inches/g. and a 4% solution has a pH of 4. It is marketed under the tradename of Baymal Colloidal Alumina.

The partially polymerized alumina is dispersed in the aqueous solution containing the silica hydrosol and the nickel salt.

The next step in our process is the coprecipitation of the silica hydrogel and the nickel salt with an anion capable of forming a water insoluble salt with the nickel so as to form a slurry of the precipitated nickel salt within the interstices of the alumina silica gel thereby forming a catalyst complex in which the nickel is supported upon the silica alumina gel. A suitable salt useful for precipitating the nickel is ammonium carbonate.

The precipitated nickel salt is then filtered and dried by heating to a temperature ranging from 200–300° F. and then is converted to the dimerization catalyst by heating it at elevated temperature in the presence of air prior to use. Exposure to temperatures of 800° F. to 1400° F. and preferably from 1000° F. to 1100° F. for periods of from 0.1 to 50 hours is generally sufficient. Shorter activation times are used with a higher activation temperature and vice versa. The activation is generally carried out in the presence of an oxygen-containing gas such as air.

Suitably, the amount of nickel expressed as NiO contained in the catalyst complex ranges from 1 to 35 weight percent, preferably from 5 to about 20 weight percent of nickel oxide, expressed as Ni based on the total weight of the catalyst complex.

The amount of alumina ranges from 1 to 45 weight percent and preferably, from 5 to 15 weight percent, expressed as $Al_2O_3$, based on the total weight of the alumina-silica gel; and the amount of silica ranges from 99 to 55 weight percent and preferably from 95 to 85 weight percent, expressed as $SiO_2$, based on the total weight of the alumina-silica gel.

The surface area of the catalyst complex prepared in the aforesaid method ranges from 350 m.$^2$/gram to 550 m.$^2$/gram. The pore volume ranges from 0.40 cc./gram to 0.81 cc./gram.

The reaction rate of the codimerization of propylene with n-butene is found to be a function of catalyst concentration and the amount of catalyst in the codimerization zone ranges from 1% to about 100% and preferably from about 2% to about 50% of the catalyst based on the total weight of the reactants employed in the reaction mixture.

The codimerization of the monoolefins is effected in a zone under conditions which may vary within a wide range but in general involves a temperature ranging from about 140° F. to 300° F., and preferably from 175° F. to 250° F. Sufficient pressure is provided to maintain the reaction system in liquid phase at the selected temperature of reaction. Preferably, the pressure employed ranges from about 150 lbs. per square inch to about 1000 lbs. per square inch, and more preferably, from about 200 lbs. per square inch to about 500 lbs. per square inch.

In this reatcion, the molar ratio of the $C_4/C_3$ olefins in the feed is an important operating variable and greatly influences the selectivity of the reaction system to produce the heptenes.

Under the normal conditions of operation, the molar ratio of $C_4/C_3$ olefins ranges from 1:1 to 5:1 and preferably from 2:1 to 3.5:1. Liquid phase operation facilitates controlled reaction temperature and contributes to catalyst life by diminishing the deposition of high molecular weight or other nonvolatile or insoluble materials onto the catalyst surface. The liquid hourly space velocity in a fixed catalyst bed operation for example, may be as high as about 20, but usually about 10 volumes of liquid per volume of reactor space per hour is preferred.

The following examples will demonstrate the effectiveness of a $SiO_2$-$Al_2O_3$-NiO catalyst complex prepared in the manner described hereinafter for selectively producing lightly branched heptenes in the codimerization of propylene with n-butenes.

The following preparations were used in forming the catalyst complex:

Catalyst Preparation A (invention)

To 4 pounds of Amberlite IR–120 resin, which had been previously washed with several portions of 1 to 2% sulfuric acid and then rinsed with water were added 187 cc. (76.4 grams $SiO_2$) of sodium silicate gel liquid contained in 1800 ml. of water. The mixture was stirred for 15 minutes and filtered. The resin was then washed with 200 to 300 ml. water and the two liquids then mixed. To this solution 62.5 grams of $Ni(NO_3)_2$—$6H_2O$ contained in 625 ml. of water were slowly added and the resulting solution stirred for one half hour. 12.5 grams of Baymal colloidal alumina contained in 250 ml. of water were added to the solution with additional stirring for one half hour in order to disperse the colloidal alumina throughout the solution. After which, 32.8 grams of ammonium carbonate, contained in 200 ml. of water, were slowly added to the solution to form a slurry. The slurry was stirred for one hour, filtered and dried. The temperature of the slurry was raised to 160° F. and held at this point overnight in order to increase the pore volume of the catalyst. The catalyst was then calcined at 1100° F. for six hours. The catalyst complex so produced contained 15.3 wt. percent of NiO, 9.3 wt. percent of $Al_2O_3$ and the balance $SiO_2$, a surface area of 574 m.$^2$/g., a pore volume of 0.55 grams/cc.

Catalyst Preparation B (Coprecipitated method of prior art)

To 3 lbs. of Amberlite IR–120 resin which had been previously washed with several portions of 1 to 2% of sulfuric acid and then rinsed with water, were added 98 cc. of $Na_2SiO_3$ (40 grams of $SiO_2$) liquid in 900 ml. of water. The mixture was stirred for 15 minutes and filtered. The resin was washed with 200 or 300 ml. of water and combined with the filtered solution. To this solution was added 82 grams of Al(NO$_3$)$_3$·9H$_2$O (10 gms. of Al$_2$O$_3$) contained in 400 ml. of water and the solution was stirred for fifteen minutes. After stirring 40 gms. of $$Ni(NO_3)_2—6H_2O$$

contained in 400 ml. of water were added and the solution was again stirred for fifteen minutes followed by slow addition of 75 grams of ammonium carbonate contained in 150 ml. of water. The formed gel was then stirred for 2 hours at room temperature and aged 2 hours at 200° F. followed by filtering and drying. The catalyst was calcined at 1000° F. for 16 hours. The catalyst complex so produced contained 11.3 weight percent of NiO–20.9 weight percent of the Al$_2$O$_3$ and the balance SiO$_2$, a surface area of 345 m.²/grams and a pore volume of 0.32 gram/cc.

Catalyst Preparation C (Impregnated method of prior art)

290 grams of NiNO$_3$—6H$_2$O were dissolved in 500 ml. of water. To this solution was added 270 grams of finely powdered cracking catalyst (25% Al$_2$O$_3$–75% SiO$_2$) which had previously been calcined at 1000° F. The slurry was stirred vigorously while adding 152.5 grams of ammonium carbonate contained in 1500 cc. of water. The stirring was continued for an additional hour after which the solution was filtered and recovered; the catalyst was dried at 300° F. for a period of 24 hours. The catalyst was then calcined for 6 hours at 1100° F. and stored out of contact with moisture until its use in Example 1.

EXAMPLE 1

The runs were made in a batch operation using a stirred autoclave at an autogenous pressure. The nickel oxide catalyst preparations A and C as described above, were each individually charged into the autoclave and then the n-butene and propylene were then added and the reactor was raised to the appropriate temperature. The sufficient propylene and normal butene were added to the reactor in order to form a reaction mixture having 1.8/1 C$_4$/C$_3$ molar feed ratio. The reaction was conducted for 60 minutes at a temperature of 176° F. Reaction product mixture in each instance was discharged from the reactor at the termination of the run and analyzed. The following table compares the selectivity for the C$_7$ production in this reaction. The results are determined at the 25% conversion level and the 35% conversion level and the amounts represent productivity on the weight basis of the total liquid volume. It does not take into account any unreacted butene or propylene. One run was made using the catalyst prepared by Procedure A. The autoclave was cleaned and a second run using the catalyst prepared by Procedure C was made. All other conditions were the same as in the first run.

|  | 25% conversion | | 35% conversion | |
|---|---|---|---|---|
|  | C$_7$ | C$_9$ | C$_7$ | C$_9$ |
| Run I—Catalyst preparation A, percent | 42 | 17 | 41 | 17 |
| Run II—Catalyst preparation C (impregnated), percent | 39 | 18.5 | 38.5 | 21 |

The catalyst was then aged in a continuous pilot plant under reaction conditions followed by regeneration and the 25% and the 35% conversion levels were again checked.

|  | 25% conversion | | 35% conversion | |
|---|---|---|---|---|
|  | C$_7$ | C$_9$ | C$_7$ | C$_9$ |
| Run III—Catalyst preparation A, percent | 41.5 | 16.5 | 39 | 19 |
| Run IV—Catalyst preparation C (impregnated), percent | 37.5 | 22.5 | 36 | 26 |

This example demonstrates that the catalyst prepared according to Procedure A maintains its selectivity over a longer period of time and initially possesses higher selectivity that that of an impregnated NiO catalyst towards the production of C$_7$ in the reaction mixture.

EXAMPLE 2

A series of runs were made to compare the catalysts made by Procedures A, B and C under the same conditions as set forth in Example 1. They were sampled at the 20% conversion, 30% conversion and 40% conversion.

|  | 20% conversion | | 30% conversion | | 40% conversion | |
|---|---|---|---|---|---|---|
|  | C$_7$ | C$_9$ | C$_7$ | C$_9$ | C$_7$ | C$_9$ |
| Run V—Catalyst preparation A, percent | 44 | 11 | 43.5 | 12 | 42.5 | 15.5 |
| Run VI—Catalyst preparation B, percent | 43.5 | 13 | 41.5 | 17.5 | 38 | 22.5 |
| Run VII—Catalyst preparation C, percent | 41 | 14 | 41 | 15.5 | 40 | 18 |

It is readily seen by this Example that the catalyst made by Procedure A provides better selectivity to the formation of C$_7$s which is the valuable portion of the reaction mixture in a propylene-normal butene codimerization than that prepared by either of the other known catalyst preparations.

EXAMPLE 3

Examining the skeleton structure of the C$_7$ fraction of each catalyst indicates that the catalyst preparation A gives a product that is less branched than is preparation C. The table below indicates that the product produced by preparation A contains only about 40% of the amount of doubly branched isomers as does catalyst C. These results were determined by hydrogenation of the olefins by hydrocarbons with hydrogen over a 1% Pd on Al$_2$O$_3$ catalyst and examining the skeleton isomers by gas chromatography. The products produced by a reaction over catalyst Procedure A are more valuable due to the decrease in branched structures.

DISTRIBUTION OF CARBON SKELETON ISOMERS OF HEPTENES

| Carbon skeleton | Catalyst preparation A | Catalyst preparation C |
|---|---|---|
| 2,2-dimethylpentene | 0.3 | Trace |
| 2,4-dimethylpentene | 0.5 | Trace |
| 2,3-dimethylpentene | 12.0 | 30.3 |
| 3-methylhexene | 41.7 | 40.0 |
| 2-methylhexene | 20.3 | 14.9 |
| n-Heptene | 25.3 | 14.6 |

In summary, the nickel oxide in the impregnated catalyst is spread over the surface of the base and associated with the base in some physical manner. In the coprecipitated catalyst, the nickel oxide is chemically bonded to the base thereby providing active sites that are more selective to the production of heptene dimers than does a nickel oxide which is impregnated onto a silica-alumina base. However, the data indicates that if the catalyst is made by coprecipitating the nickel and silica onto the colloidal alumina, its performance is superior over a catalyst preparation in which all three constituents, nickel, alumina, silica, are coprecipitated. It is seen in Example 2 that the selectivity of the catalyst is reduced. Example 1 shows that the selective maintenance of this catalyst with aging under a reaction of propylene and butene between 175 and 250° F. holds up better than does the impregnated catalyst.

What is claimed is:

1. A method for preparing an SiO$_2$-Al$_2$O$_3$-NiO catalyst complex for use in the codimerization of propylene with n-butenes which comprises the steps of forming a dispersion of colloidal alumina in aqueous solution, said solution containing a nickel salt and a hydrous silica sol; coprecipitating said nickel salt and said hydrous silica sol with a suitable anion whereby a slurry of precipitated nickel salt on alumina silica gel is formed; decomposing the nickel salt under conditions such that substantially all combined carbon oxides are removed and activating the resulting nickel oxide by heating in an oxygen containing atmosphere at a temperature ranging between 800° F. and 1400° F. for a period of time ranging from 0.1 to 50 hours thereby forming an activated catalyst wherein the amounut of nickel (Ni) ranges from 1 to 35 wt. percent based on the total weight of the catalyst, the amount of alumina ($Al_2O_3$) ranges from 1 to 45 wt. percent based on the weight of the alumina-silica gel and the weight of silica ($SiO_2$) ranges from 99 to 55 wt. percent based on the weight of the alumina silica gel.

2. A method according to claim 1 wherein said colloidal alumina is in the form of partially polymerized fibrous crystals, said crystals being from 5 to 10 millimicrons in diameter and 50 to 200 millimicrons in length and having a surface area of 200 to 400 m.$^2$ per gram.

3. A method according to claim 1 wherein said anion is carbonate.

4. A method according to claim 1 further including the step of treating an exchange resin with a silicate liquid whereby the hydrous silica sol is formed prior to the step of forming a colloidal alumina dispersion therein.

5. A catalyst for use in the codimerization of olefins prepared by the method of claim 1.

6. A catalyst according to claim 4 wherein its surface area ranges from 350 m.$^2$/gram to 590 m.$^2$/gram and its pore volume ranges from 0.40 cc./gram to 0.81 cc./gram.

References Cited
UNITED STATES PATENTS

| | | | |
|---|---|---|---|
| 2,645,620 | 7/1953 | Paterson | 252—453 X |
| 2,921,971 | 1/1960 | Holm et al. | 252—453 X |
| 3,451,947 | 6/1969 | Michael | 252—453 |
| 3,518,323 | 6/1970 | Pine et al. | 260—683.15 |

DANIEL E. WYMAN, Primary Examiner

W. J. SHINE, Assistant Examiner

U.S. Cl. X.R.

252—455 R, 459